Sept. 18, 1951     W. G. HOELSCHER     2,568,335
PUMP LUBRICATION FOR ELEVATING SCREWS
Filed June 29, 1945     3 Sheets-Sheet 1
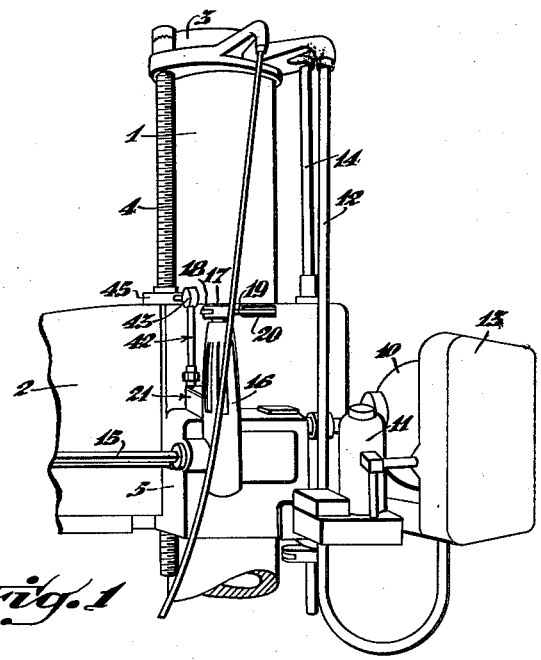
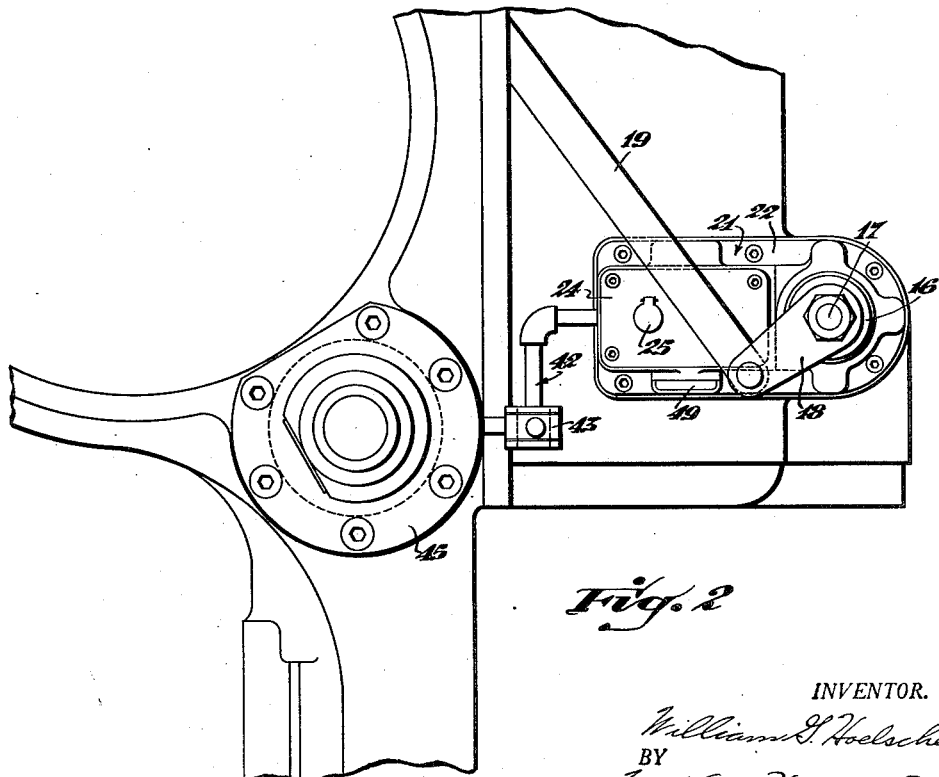
INVENTOR.
William G. Hoelscher
BY
Wood, Arey, Herron & Evans
Attorneys

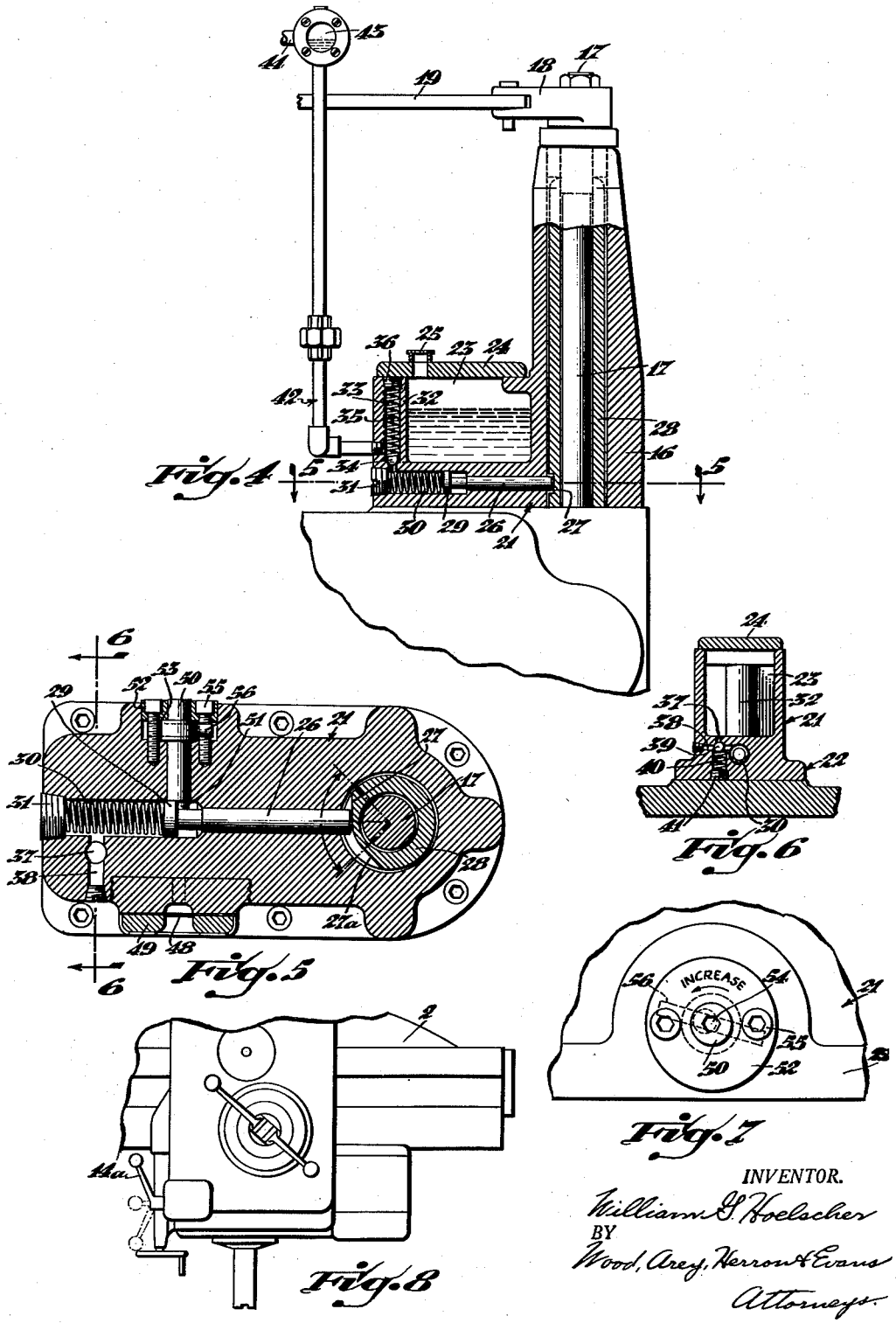

Patented Sept. 18, 1951

2,568,335

UNITED STATES PATENT OFFICE 2,568,335

PUMP LUBRICATION FOR ELEVATING SCREWS

William G. Hoelscher, Cincinnati, Ohio, assignor to The American Tool Works Company, Cincinnati, Ohio, a corporation of Ohio Application June 29, 1945, Serial No. 602,331

4 Claims. (Cl. 184—6)

This invention relates to radial drilling machines and it is directed particularly to an improved lubrication system for oiling the elevating nut and elevating screw of the apparatus.

This application is a continuation-in-part of William G. Hoelscher application, Serial No. 498,089, for Pump Lubrication for Elevating Screw, which was filed August 10, 1943, and since abandoned in favor of the present application.

The principal objective of the present invention has been to provide a simplified but foolproof and efficient oiling system which will furnish lubricant to those portions of the machine during the usage of it without requiring the constant care and attention of the operator. More specifically, the objective of the present invention has been to provide a "shot" type lubricating system operated in conjunction with the elevating control apparatus and arranged to furnish a charge of lubricant each time that the arm of the machine is to be elevated.

In a radial drill the elevating nut and screw are subjected to substantial unit bearing pressures inasmuch as the entire load or weight load of the arm is sustained by them. During normal operation of the machine the arm is raised or lowered at infrequent intervals. If the operator oils the machine at the beginning of a day's work it is likely that a major portion of the oil has drained away by the time, later on in the day, when the elevating apparatus is required to be used, and in such event the parts, improperly lubricated, are badly worn.

Continuous oiling of the nut and screw is not desirable not only because it is unnecessary but because oil seeps along the screw thread and flows downwardly where it accumulates in puddles around the stump of the machine. Gravity feed systems have been proposed but are not desirable for the reason that the lubrication ducts may become clogged or constricted through dust or dirt to prevent the oil from reaching the vital areas. The operator, seeing a full reservoir, knows nothing of this dangerous condition.

Seepage of oil from the elevating screw and nut is particularly difficult to control because while the screw threads bear high pressures on their upper facial areas, still circumferential clearance is necessary between the peak of the thread of the screw and the root of the thread in the nut, and this clearance furnishes a passageway extending the entire length of the nut through which oil may flow without restriction. Due to the screw thread configuration wipers are not effective for prolonged periods to block the oil flow. It also may be observed that the primary need for lubricant exists only when the arm is being elevated, and not when the arm is being lowered. During lowering the screw acts primarily as a restraining device to prevent the column from falling; that is, as the screw is rotated the column lowers itself by its own weight; the pressure on the screw thread is low and little force is required. On the other hand, in elevation of the arm approximately five times as much power is required to rotate the screw and it is apparent that the screw thread is subjected to a correspondingly high pressure and correspondingly high friction.

The present invention, briefly, is predicated upon the concept of providing a "shot" feed pump having a plunger which is actuated to deliver oil to the nut and screw when the elevating control handle with which the radial drill is equipped is moved to a "raising" position. In this manner lubricant is delivered as required but not in such surplus amounts that oil is wasted, or in such amounts that oil is allowed to seep through the clearance passageway and collect in undesirable accumulations at the base of the machine.

Lubricant is delivered to the pump from a reservoir which is carried on the arm of the machine and, at each operation of the plunger attending an elevating movement of the arm, a charge of oil is forced from the pump into a duct which leads to the nut and screw. By virtue of the clearance passageway at the screw thread and the nut the minimum seepage of oil which does occur following each shot is sufficient to provide lubrication during arm lowering operations.

In the preferred structure a simplified arrangement for control of the pump is provided through camwise configuration of the control arm or of a shaft which is operated in unison therewith whereby movement of the pump plunger is effected when the control lever or control arm is actuated for rendering the elevating mechanism effective to lift the arm. Inasmuch as the control arm is movable from a centralized position to a lowering as well as to a raising position, the cam has a clearance area in lowering position which prevents actuation of the pump as the control arm is shifted to lowering position. The lubricant delivery duct extends above the pump, preferably with a sight glass at its head, while a check valve is located at its lower portion to prevent back flow of lubricant. This duct therefore always stands full of oil and at each operation of the lever the charge of oil delivered from the pump can be seen to surge at the sight glass.

The operator therefore actually sees the delivery of oil at the vital area where it is needed.

By virtue of the shot delivery, oil is furnished just prior to the time when it is needed, but not otherwise. The seepage and waste lubricant are reduced and, while all of the parts are kept lubricated, still there is no unsightly or dangerous accumulation of oil at the lower end of the screw or around the stump.

From the foregoing discussion of the principles of the invention and from the following detailed description of a preferred embodiment of it, those skilled in the art will comprehend the various modifications to which the invention is susceptible.

In the drawings:

Figure 1 is a fragmentary perspective view showing the rear portion of a radial drill embodying the lubrication apparatus of the present invention.

Figure 2 is a fragmentary plan view looking down upon the arm at the elevating screw and lubricating apparatus.

Figure 4 is a sectional elevation through the lubrication apparatus.

Figure 5 is a sectional view taken on the line 5—5 of Figure 4.

Figure 6 is a sectional view taken on the line 6—6 of Figure 5.

Figure 7 is a fragmentary elevation showing the apparatus for adjusting the pump stroke.

Figure 8 is a view of the head of the machine showing the lever through which the operation of the elevating apparatus is controlled.

Figure 3:
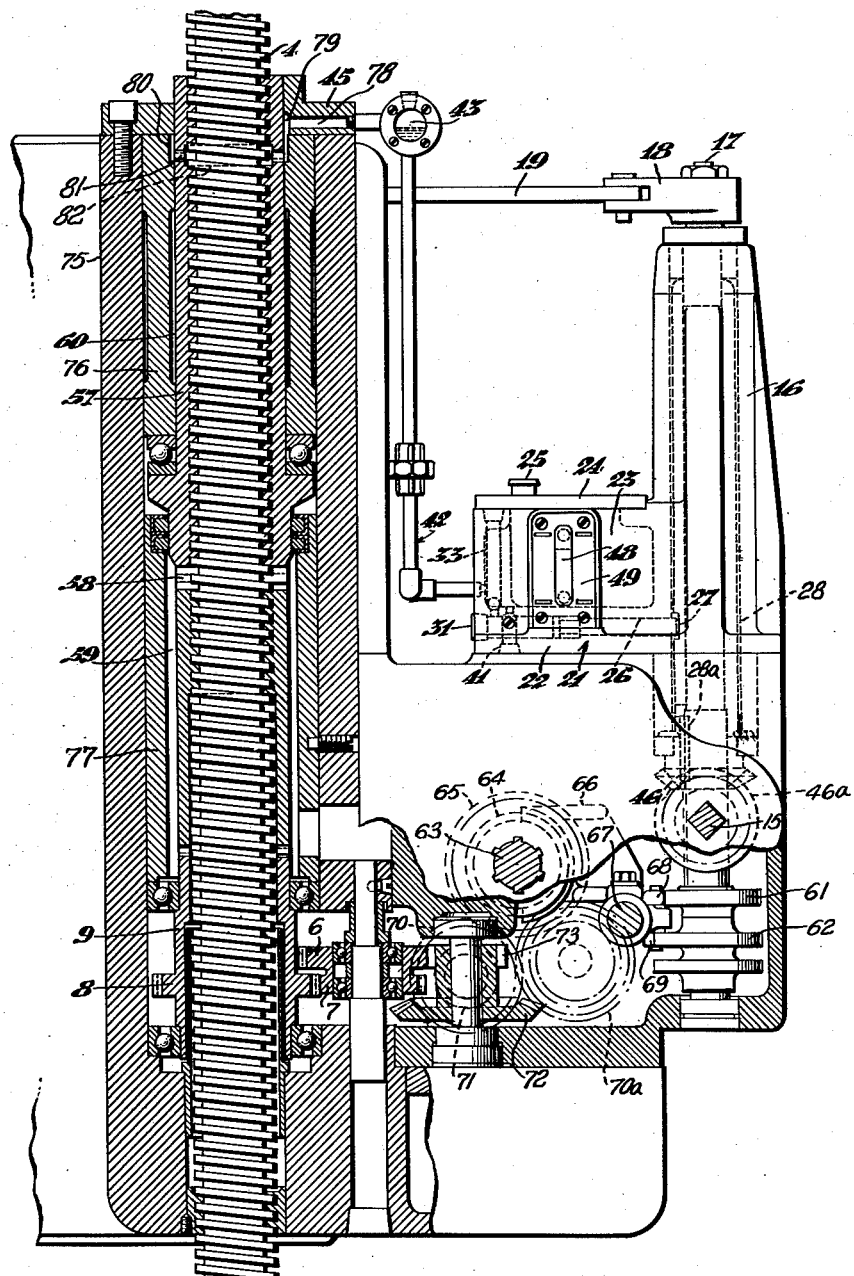
Figure 3 is a sectional elevation taken through the elevating screw and nut and showing the lubrication apparatus in elevation.

The radial drill embodying the present invention as shown best in Figure 1 comprises a column 1 which may be mounted upon a stump extending from a base. An arm 2 is translatable in up and down directions of the column and the column is provided with a cap 3, while an elevating screw 4 is suspended from the cap and traverses the arm 2. At the rearward portion of the arm a suitable elevator driving mechanism is located within a housing 5. The elevating mechanism gearing terminates in a couplet of gears 6 and 7 (Figure 3), the latter being in mesh with a gear 8 of an elevating nut 9. The nut is sustained within the arm and, therefore, when the gear 7 is driven through the elevator mechanism the elevating nut is rotated, whereby it travels up or down, the elevating screw carrying the arm 2 with it. The apparatus for driving the spindle of the drill head which is carried by the arm may be conventional, and inasmuch as it forms no part of the present invention it is not shown in the drawings. This apparatus may be driven from a motor 10 located on the short end of the arm. The apparatus for rotating the nut for raising and lowering the arm also may be driven from motor 10 and is illustrated in Figure 3 and is described hereinafter.

A clamp actuator for holding the column in non-rotatable position on the stump is indicated generally in Figure 1 at 11. This apparatus and the associated pendent wiring 12, control box 13, and clamp rod 14 also form no part of the present invention and are, therefore, not described in detail, though the clamp actuator is disclosed and claimed in a copending application, Serial No. 491,894, filed June 23, 1943, and which has since been abandoned.

At the head of the machine a directional elevating control lever may be located, preferably at a convenient point in front of the operator. This lever 14a, in the case of the machine shown, and in machines of similar type, has three positions—"raising," "clamping" or neutral, and "lowering" as shown in Figure 8. Thus when the lever is in the raised position as shown by the solid lines the arm is being raised, and vice versa, and, while in the mid position, the arm is stationary. An arm clamping mechanism also is provided for coaction with the column whereby the arm, when not being raised or lowered, is clamped firmly against any translating movement. The arm clamping and elevating mechanism contained within the gear box 5 are operated alternately, that is, when the control lever 14a at the head of the machine is in "raising" position, and the arm clamp is automatically released before the elevating mechanism becomes operative. A similar action takes place when the control lever is in "lowering" position. When the control lever is in neutral position the raising and lowering mechanism is declutched and the clamping elements are active.

In the machine shown in the drawings, movements from the control lever are conveyed through the square shaft 15 which passes along the rear face of the arm to the mechanism in the gear box 5. A post 16 extends vertically from the gear box to rotatably carry a rock shaft 17 having a lever 18 at its upper end. This lever is connected with a clamp link 19 which passes through a slot 20 in the arm to the clamping elements contained therein and suitable connection is provided for imparting the rotary motion of the shaft 15 to the shaft 17.

The elevating control system just described is representative of various arrangements known in the art, all characterized in that, at one point or another, they have an element corresponding in function to the lever 14a which is moved or shifted when the head is to be raised or lowered. The lubrication apparatus of the present invention operates in conjunction with such an element.

The lubrication apparatus comprises a housing indicated generally at 21, including a base portion 22 and a reservoir portion 23. This unit conveniently may be installed at the upper portion of the housing 5 intermediate the rear face of the arm 2 and the forward face of the post 16, and may be formed as an integral part of the post casting.

The housing 21 is hollow at its upper portion to constitute the reservoir 23. The top is open and a cover plate 24 is placed over the top. The cover plate contains a filler cap or other suitable inlet 25, through which lubricant is introduced into the reservoir.

Base 22 has a bore extending through it longitudinally of the unit, which bore, at its forward end, constitutes a pump cylinder arranged beneath the reservoir to receive a pump plunger 26. The rearward end of the plunger 26 extends into engagement with a cam 27 which is cut into, or provided on, a rotatable sleeve 28 surrounding the rock shaft 17. The sleeve 28, through suitable connections, is arranged to be rotated in one direction or the other as the elevating mechanism is brought into action to raise or lower the arm 2. Cam 27 extends in a direction peripherally of the sleeve and is of such configuration that, as the sleeve is rotated, the plunger is moved longitudinally within its bore.

Plunger 26 terminates in a head 29 which constitutes the piston of the pump. A compression spring 30 is interposed between the head of the plunger and a plug 31 which is threaded into the base. The spring, therefore, urges the plunger toward the cam surface of the sleeve 28.

For purposes of illustration, in the apparatus shown in the drawings, it is assumed that the cam 27 (as shown in Figure 5) rotates in a counterclockwise direction when the head is to be raised and in a clockwise direction when the head is to be lowered. As shown in Figure 5 the plunger 26 is in a released or retracted position and as the cam is rotated counterclockwise the plunger rides up the surface of the cam and it is thrown forwardly to exert a pumping action which continues until the circular part of the cam assumes a position behind the plunger. Such a position corresponds to a fully shifted position of the control arm to effect elevation of the arm of the machine. On the other hand, the cam surface at the opposite side of the plunger contains a clearance portion 27a which may be concentric with the outer periphery of the cam so that is is ineffective for operating plunger 26 when the elevating control lever is shifted to lowering position. In other words, as the cam 27 is rotated in a clockwise direction from the position in which it is shown in Figure 5 no movement is imparted to the plunger 26; the plunger simply rides against the circular or clearance portion of the cam until the control lever is fully shifted to its lowering position. In this manner a cam of simple configuration is provided which is effective for selectively actuating the plunger to cause it to deliver lubricant attending elevation of the machine arm and not to deliver lubricant attending lowering of the machine arm.

The shape of the cam is fully illustrated in Figure 5. The main or flat surfaces of the cam indicated at 27 and 27a are tangentially disposed with respect to an intermediate portion which is concentric with the axis of the cam. The cam is disposed relative to the plunger 26 so that rotation of the cam in a clockwise direction, which is the position it assumes during the lowering movement of the arm, will not translate the plunger in that the plunger merely rides on the concentric portion. However, if the cam is rotated in an anti-clockwise direction the angular surface 27 bearing against the plunger causes translation thereof until the plunger is riding on the outer concentric surface of the cam and a shot of lubricant has been delivered. The portion 27a is not a cam portion but is a clearance portion having no operative effect upon the plunger.

A vertical web 32 projects into the reservoir from an end wall of it and this web is bored, as at 33, to provide an opening communicating with the pump cylinder bore extending longitudinally of the base. The bore 33 is of reduced diameter at its lower end to provide a seat for a ball 34 which constitutes a check valve. A compression spring 35 rests upon the upper surface of the ball, its upper end in turn being held to a plug 36.

Oil is introduced to the pump cylinder from the reservoir through two intersecting bores 37 and 38, as shown in Figure 6. The latter of these extends laterally through the base from the outside of the housing into the pump bore, while the former, 37, extends vertically through the floor of the reservoir to intersect the bore 38 and pass beyond it through the base as a bore of enlarged diameter.

At the point of intersection of the bores 37 and 38, a ball 39 is provided which is pressed upwardly to constrict the flow of oil from the reservoir by means of a compression spring 40, the lower end of which seats against a plug 41.

From the vertical bore 33 there is an outlet opening which communicates with discharge piping indicated generally at 42. This piping rises above the reservoir to a sight glass 43, from which a delivery pipe 44 extends laterally to a cap 45 which surrounds the elevating screw at the upper portion of the arm, that is, substantially at the point where the screw enters the arm.

In the apparatus shown in Figure 3, shaft 17 traverses sleeve 28 and is keyed as at 28a to the lower end of the sleeve so that the shaft and sleeve move in unison. A bevel gear 46 also is non-rotatably keyed to shaft 17 by the key 28a which is common to the gear and sleeve. Gear 46 meshes with a beveled gear 46a which is fixed upon the end of shaft 15, shaft 15 being operated by the manual control lever.

The lower end of shaft 17 includes a pair of cams 61 and 62 which are keyed to the shaft for unitary rotation with sleeve 28, the cams being arranged to couple the elevator gearing to a power shaft for driving the elevating nut and operating the lubricating apparatus when the hand lever is shifted in the appropriate direction. Generally described, the elevator gearing is driven from a power shaft 63 having a reversing clutch 64 which is arranged to drive the elevator gearing in raising or lowering directions depending upon the direction of movement of a clutch yoke 66 carried upon a slide shaft 67. The slide shaft 67 is connected to the cams 61 and 62 by means of cam rollers 68 and 69 so arranged that rotary movement of shaft 17 shifts the clutch yoke. The detailed construction of the reversing clutch, cams and rollers for shifting the clutch yoke are not relevant to the present invention and have been omitted from the disclosure. The structure disclosed is intended merely to exemplify one form of interconnection between the elevator gearing and lubricator.

Clutch 64 includes a pair of gears 65—65, one gear 65 meshing directly with a gear 70 while the other meshes with a second gear 70 through an idler gear couplet 70a. Gears 70—70 both drive a bevel gear 71 which meshes with the bevel gear 72. Bevel gear 72 includes a spur gear 73 meshed with the idler gear 6 and thereby drives gear 8 of the elevating nut by way of gear 7. The clutch arrangement is such that when the manual control lever is in neutral position, gears 65 are unclutched with respect to power shaft 63, but when the lever is swung to raising or lowering position, the clutch drives one or the other of the gears 65 which in turn rotate the nut in the appropriate direction to raise or lower the arm. The arrangement is such that the arm is elevated when the sleeve is rotated anti-clockwise in the oil delivery direction so that oil is supplied during the elevating movement only.

Thus, referring to Figure 5, as the sleeve 28 is rotated in counter-clockwise direction, corresponding to initiation of an elevating movement of the arm, its cam causes the pump plunger 26 to be moved longitudinally in the pump cylinder, expelling oil which is ahead of it, upwardly through the discharge bore 33 and out through the delivery piping 42. The pressure of the oil lifts the ball 34 from its seat so that the passage is not constricted. A shot of oil, therefore, is delivered as raising movement of the arm is initiated.

When the arm 2 has been moved to its desired height, the operator returns the control handle at the head of the machine to a neutral position, whereby the sleeve 28 is returned in a clockwise direction. (Shaft 17 simultaneously may be moved to effect a clamping action.) The return movement of the sleeve 28 causes its cam surface to recede from the plunger, but the plunger follows under influence of spring 30. Backward movement of the plunger permits check valve 34 to close, while the suction created in the pump cylinder unseats the ball 39 and permits oil to flow into the cylinder through the passageways 37 and 38. The cylinder thus becomes filled, awaiting further action of the elevator apparatus.

At the upper portion of the housing adjacent the reservoir a sight glass 48 is installed, consisting of a transparent window held in place against packing by means of a panel 49. At another portion of the housing adjacent the base a pump stroke adjustment apparatus is provided comprising a stud 50 which passes through the base at substantially the plane of the pump bore and laterally of the plunger. This stud has an eccentric pin 51 at its inward end which engages the rearward face of the plunger head 29. At the outer face of the base, the bore through which the stud passes is of enlarged diameter to receive a retainer ring 52 which rests against a shoulder 53 provided on the stud. The outer end of the stud is configurated, as at 54, to receive a wrench, whereby it may be rotated while lock bolts 55 pass through the ring 52 at opposite sides of the stud into threaded engagement with the base. When the bolts 55 are unloosened, the stud 50 may be rotated to adjust the longitudinal position of the plunger in the cylinder with respect to the cam 27, whereby the quantity of lubricant delivered at each shot may be varied. A pin 56 passes laterally through the stud behind the ring 50 and abuts the screws 55 to limit the amount of adjustment which may be obtained. The purpose of limiting rotation of the eccentric stud is to enable the pump delivery to be set at any given value when the parts are first assembled, or when the parts are being reassembled if the pump has been dismantled. In such events the eccentric stud is first rotated to a "stop" position then moved in an opposite direction an amount corresponding to the desired pump delivery. The stops thus furnish a reference point from which delivery may be varied.

Referring to Figure 3, it will be seen that the discharge conduit 42 enters an opening in the cap 45, beneath which suitable clearances are provided to permit the oil to seep downwardly along the screw and provide its lubrication. The elevating nut assembly is preferably of the safety type embodying the lower portion 9 and an upper portion 57, these two portions being connected with one another through the usual clutch teeth 58. As the main driving nut 9 becomes worn, the two elements 57 and 9 are relatively separated from one another, if the main nut 9 is worn to a dangerous degree. In such event the weight of the arm is carried by the nut 57. The nut portions 9 and 57 are mounted within a cylindrical housing 75 which forms a part of the arm 2, the nut being journalled for rotation within a pair of bearing sleeves 76 and 77 one above the other.

The lubricant delivered by pipe 42 is fed to the elevating screw 4 by way of a lubricant passageway 78 which extends through cap 45 from the pipe 42 to a clearance slot 79 formed in the inside diameter of the cap. The upper end of the upper bearing sleeve 76 is counterturned internally to provide a circumferential clearance area 80 surrounding the upper end of the nut portion 57. The lubricant passes through the nut to the screw by way of the radial holes 81 drilled through the nut, the inside diameter of the nut being provided with an internal clearance groove 82 surrounding the screw. The circumferential clearance area 80 in the bearing sleeve and the radial holes 81 provide for the feeding of lubricant from the stationary cap through the nut in spite of the rotation of the nut relative to the bearing sleeves. From the internal clearance groove 82 of the nut, the oil seeps downwardly along the screw between the clearance which normally exists between nut and screw threads.

Suitable annular cavities 59 and 60 become filled with oil and keep the nuts and associated sleeves, and journals lubricated thoroughly, but there is no constant pumping pressure which would tend to cause a continuous seepage of oil from the machine.

Each time that the pump is operated, the shot of oil delivered from it may be seen to bubble at the sight glass which, as will be noted, is located closely adjacent the elevating screw. The operator, in other words, may see the delivery of oil at the point at which it is needed. From this point on, the distribution of oil to the working elements is insured and the operator, therefore, need not be concerned with possible constrictions which would block the flow of oil in a gravity feed system.

Having described my invention, I claim:

1. A lubricating system for the elevating nut and screw of a radial drill having an arm comprising; a power driven mechanism for effecting relative rotation between the nut and screw, a manually operated control lever shiftable to raising and lowering positions for rendering said elevating mechanism effective for raising and lowering said arm, a cam operatively connected to said control lever, a pump unit having an oil delivery cylinder, a plunger slidably sustained in the cylinder, the plunger having one end seated against said cam for movement by the cam when the control lever is actuated, a piston head on the opposite end of said plunger, the piston head being slidably sustained in said oil delivery cylinder, a compression spring seated upon said piston head to urge the plunger into engagement with the cam, means for supplying oil to the delivery cylinder, a conduit extending from the delivery cylinder to the nut and screw operable to deliver a shot of oil to the nut and screw when the control lever is shifted to arm raising position, a rotatable shaft extending at right angles to the oil delivery cylinder, an eccentric pin extending from said shaft and engaged behind said piston head operable to shift the plunger relative to the cam to vary the stroke of the plunger upon rotation of said shaft, and means for locking the shaft in adjusted position.

2. In a radial drill having a vertically movable arm, a nut and screw for elevating the arm, driving mechanism for rotating said nut, and a control lever shiftable to raising and lowering positions and connected to the driving mechanism for driving the nut in arm raising and lowering directions, a lubricant system for said nut and screw comprising; a lubricant pump, a cam operatively connected to the control lever to actuate said pump when the control lever is shifted to arm raising position, a conduit extending from said pump to the nut for delivering lubricant to the nut and screw, a housing for said nut, a bearing sleeve surrounding said nut within said housing, the bearing sleeve having a clearance area surrounding the upper end of the nut exteriorly thereof, a lubricant delivery conduit extending from the pump to the clearance area, the nut having lubricant holes extending radially from said clearance area to the screw to deliver lubricant to the clearance between the screw and nut threads at the upper end of the nut for passage downwardly by gravity.

3. In a radial drill having an arm, a stationary arm elevating screw, a rotatable elevating nut, power means for rotating the nut, and a manually operated lever and shaft arranged to control the power means, a lubricating system arranged to discharge a shot of lubricant to the elevating nut upon operating the control lever in arm raising direction comprising, an oil reservoir mounted upon the arm having a bearing post rising vertically therefrom, a rotatable sleeve loosely journalled therein, a vertical shaft extending through the rotatable sleeve and keyed thereto, the vertical shaft being operatively connected to the power means, a pair of gears connecting the vertical shaft to the manual control lever shaft, the said oil reservoir having a bore in its lower portion extending through the said bearing post, a cam contour formed in the rotatable sleeve, a spring loaded plunger slidably mounted in the said bore, having an end engaged against the cam contour, the said cam contour being configurated to move the plunger outwardly when the rotatable sleeve is rotated in arm elevating direction, and oil delivery passageways extending from the oil reservoir to the bore and from the bore to the elevating nut arranged to deliver a shot of oil to the elevating nut upon outward movement of the plunger.

4. In a radial drill having a column, an arm, an arm elevating screw, a rotatable elevating nut, power means for rotating the nut, a manually operated control lever and shaft arranged to control the power means for driving the nut in arm raising and lowering directions, and an arm clamp link for locking the arm to the column when the arm is in a neutral position, a lubricating system arranged to discharge a shot of lubricant to the elevating nut upon operation of the control lever in arm elevating direction comprising, an oil reservoir mounted on the arm having a bearing post rising vertically therefrom, a rotatable sleeve loosely journalled in the bearing post, a vertical shaft extending through the rotatable sleeve and keyed thereto, the lower end of said vertical shaft being operatively connected to the power means to control the rotation thereof, the upper end of said vertical shaft being operatively connected to the arm clamp link for locking the arm to the column when the control lever is in a neutral position, a pair of gears connecting the vertical shaft to the manual control lever shaft, the said oil reservoir having an oil delivery plunger slidably mounted therein, the rotatable sleeve having a cam surface engaged by the said plunger configurated to move the plunger outwardly when the rotatable sleeve is rotated in arm elevating direction, and oil delivery passageways arranged to supply oil to the oil delivery plunger and from the plunger to the elevating nut to deliver a shot of oil to the nut upon outward movement of the plunger.

WILLIAM G. HOELSCHER.

REFERENCES CITED

The following references are of record in the file of this patent:

UNITED STATES PATENTS

| Number | Name | Date |
| --- | --- | --- |
| 1,545,065 | Randolph et al. | July 7, 1925 |
| 2,075,755 | Anderson | Mar. 30, 1937 |
| 2,164,518 | Hart | July 4, 1939 |
| 2,190,858 | Bennett | Feb. 20, 1940 |
| 2,209,938 | Schauer | July 30, 1940 |
| 2,229,095 | Kocher | Jan. 21, 1941 |